Figure 1:
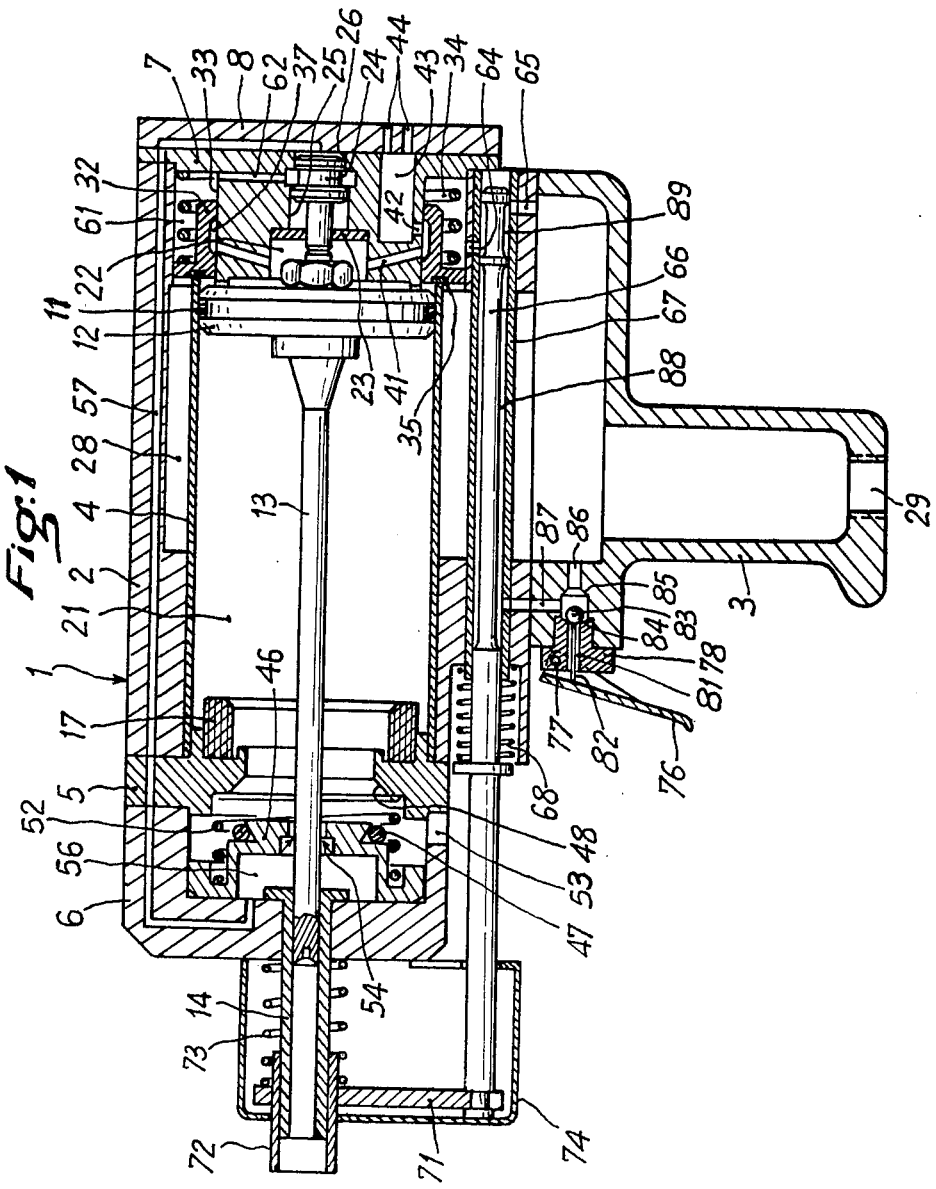

United States Patent [19]
Herubel

[11] 4,280,248
[45] Jul. 28, 1981

[54] COMPRESSED-AIR PISTOL OF THE HUMANE KILLER TYPE

[75] Inventor: Jean-Frederic Herubel, Guebwiller, France

[73] Assignee: N. Schlumberger & Cie, Guebwiller, France

[21] Appl. No.: 969,091

[22] Filed: Dec. 13, 1978

[30] Foreign Application Priority Data

Dec. 16, 1977 [FR] France ............................ 77 37989

[51] Int. Cl.³ .............................................. A22B 3/02
[52] U.S. Cl. ......................................... 17/1 B; 124/40; 124/61; 124/75; 227/130
[58] Field of Search ............... 124/61, 73, 74, 75, 124/76, 77, 40; 17/1 R, 1 A, 1 B; 43/6; 91/461; 173/168, 169; 227/130; 30/180, 228

[56] References Cited
U.S. PATENT DOCUMENTS

| 3,771,710 | 11/1973 | Perkins et al. | 227/130 |
| 3,798,707 | 3/1974 | Willems et al. | 17/1 B |
| 4,122,904 | 10/1978 | Haytayan | 227/130 X |
| 4,187,708 | 2/1980 | Champoux | 72/30 |

FOREIGN PATENT DOCUMENTS 285532 1/1971 U.S.S.R. .................................. 17/1 B

Primary Examiner—Richard T. Stouffer

[57] ABSTRACT

The pistol is so designed that the valve for controlling the forward stroke of the piston is applied directly against the open rear cylinder end which is surrounded by an annular chamber, the chamber being also open at the rear end and in communication with the inlet for connecting-up with the compressed air supply.

7 Claims, 3 Drawing Figures

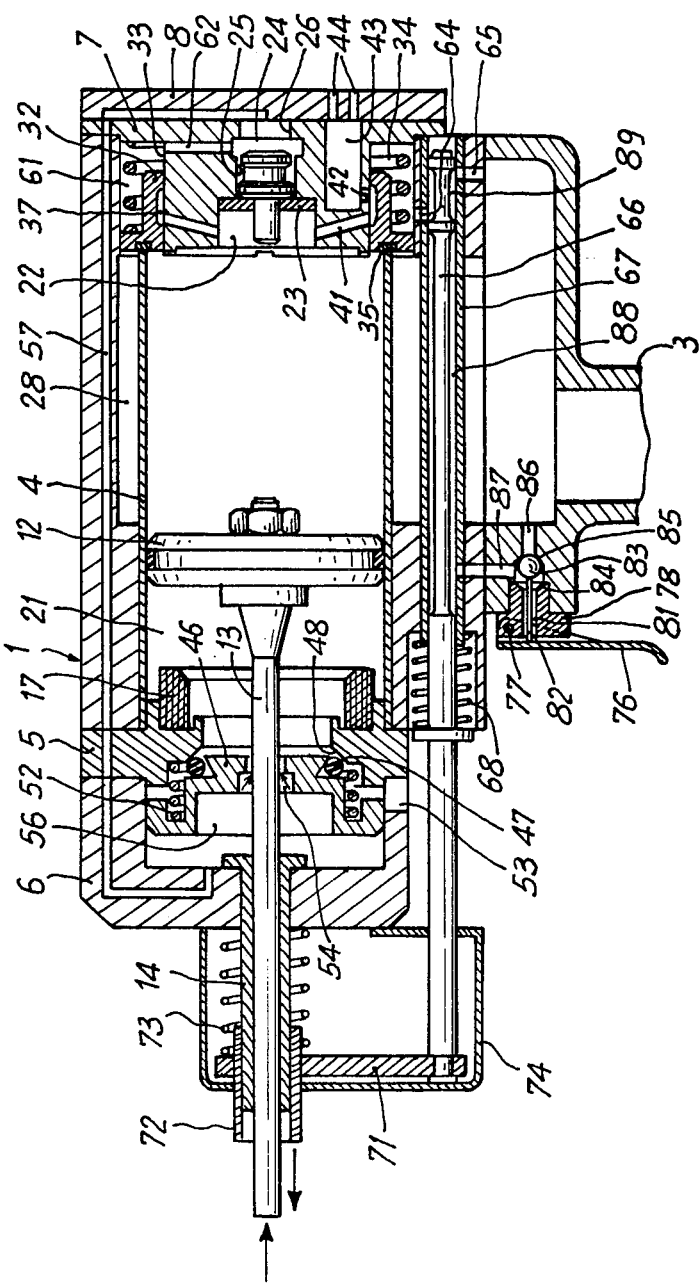

COMPRESSED-AIR PISTOL OF THE HUMANE KILLER TYPE

This invention relates to a compressed-air pistol of the humane killer type for slaughtering animals. The pistol comprises a hollow body provided with an inlet for connecting-up with a compressed air supply and a cylinder located within said body, a piston which is rigidly fixed to a striker-pin being capable of sliding motion within said cylinder. Said striker-pin can be displaced in sliding motion through an orifice of said body which is coaxial with the cylinder in response to action produced on an external trigger which operates a valve for controlling the forward stroke of the piston in order to initiate the admission of compressed air into the cylinder.

Known slaughtering pistols of this type (also designated as "humane killers") have the disadvantage of operating under very high compressed air pressures of the order of 140 bar, for example. The aim of the invention is to produce pistols of this type which are not subject to this disadvantage.

To this end, the pistol in accordance with the invention is so designed that the valve for controlling the forward stroke of the piston is applied directly against the open rear cylinder end which is surrounded by an annular chamber, said chamber being also open at the rear end and in communication with the inlet for connecting-up with the compressed air supply.

This particular structure is such that, when the operator presses the trigger, there is an abrupt inrush of compressed air into the cylinder through a passage having a very large cross-sectional area. This makes it possible to obtain a very efficient instrument which is capable of operating at considerably lower pressures than the pressures employed in conventional pistols, for example of the order of 6 bar instead of 140 bar.

The arrangement in accordance with the invention offers the additional advantage of being readily conducive to the adoption of means for automatic recoil of the piston and safety means as will become apparent hereinafter.

Figure 2:
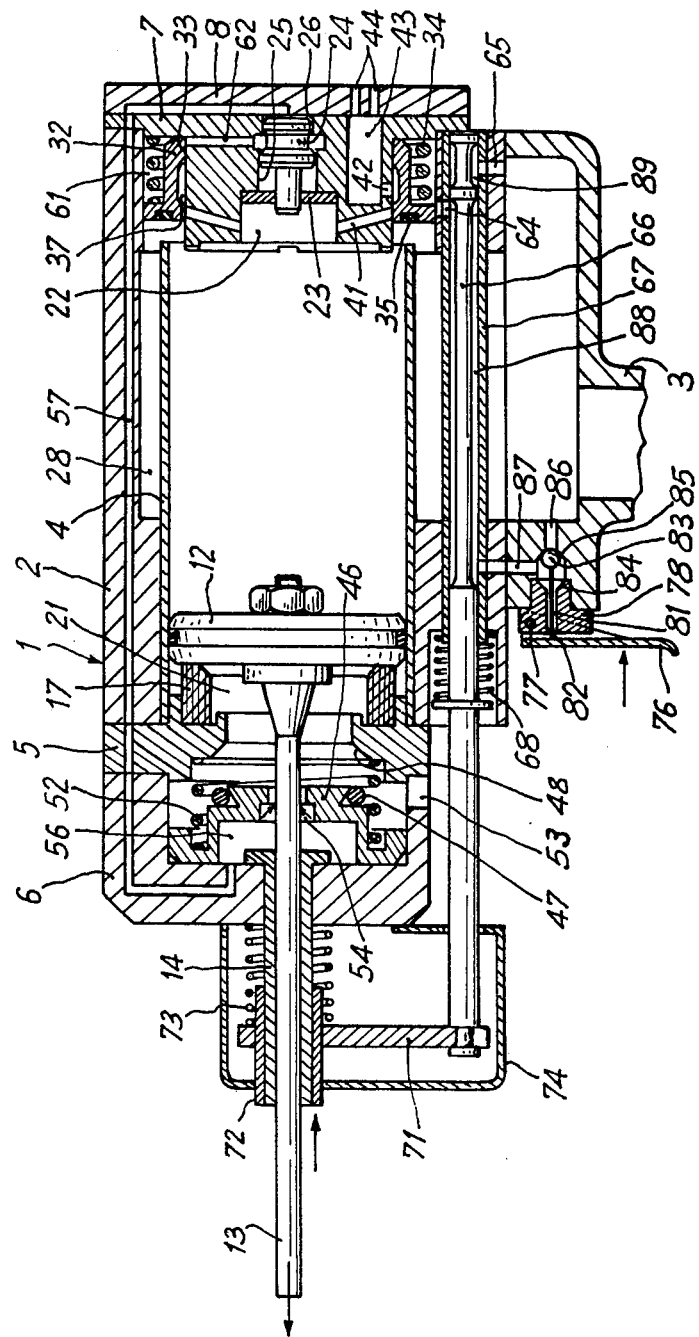

A more complete understanding of the invention will be gained from the following description and from the accompanying drawings in which one embodiment of a humane killer pistol in accordance with the invention is shown by way of example, and in which:

FIGS. 1 to 3 are longitudinal sectional views in which the pistol is shown respectively in the inoperative position, in the forward end-of-travel position of the striker-pin, and in the position of commencement of backward return of the striker-pin.

The humane killer which is illustrated in FIGS. 1 to 3 has a pistol body which is generally designated by the reference 1 and which, for production reasons, is formed by an assembly of several components, namely a main body component 2 provided with a pistol-grip 3, a cylinder 4 which is forcibly fitted within the main component 2, an annular cylinder end 5, a front body component 6, and a rear body component 7 fitted with a cover-plate 8.

A piston 12 fitted with an annular seal 11 is capable of sliding within the cylinder 4. The piston-rod or striker-pin passes very freely through the annular cylinder end 5 and is slidably mounted with slight play within a tubular guide 14 which is secured to the center of the front body component 6. The annular cylinder end 5 carries an annular elastic stop 17 which is struck by the piston 12 at the end of its forward stroke as shown in FIG. 2.

The piston 12 divides the cylinder 4 into two chambers, namely a front chamber 21 and a rear chamber 22. The rear chamber is limited at the rear end by a drilled partition 23 which is traversed by the stem of a differential slide-valve 24. The two active annular beads of the valve are intended to slide respectively within two coaxial bores 25, 26 of the rear body component 7, the diameter of the bore 25 being slightly larger than the diameter of the bore 26.

Provision is made within the main pistol body component 2 for an annular compressed-air feed chamber 28 which surrounds the rear portion of the cylinder 4 and is open at the rear end; furthermore, said annular chamber communicates with the hollow interior of the pistol-grip 3 in which is formed an inlet 29 providing a connection with a pipe for the supply of compressed air. The communication between the annular compressed-air feed chamber 28 and the rear chamber 22 of the cylinder 4 is controlled by a main annular valve 32 having a large surface area acting as a second closure member for controlling the forward stroke. Said valve is slidably mounted on a cylindrical boss 33 of the rear body component 7 and is urged against the rear end of the cylinder 4 by a spring 34 which is applied against said rear component. That portion of said main annular valve which is intended to bear against the cylinder is fitted with an annular seal 35.

The bore of the main annular valve 32 has an annular groove 37 which is intended in the position shown in FIG. 1 to connect the rear chamber 22 of the cylinder 4 to the atmosphere by means of ducts 41, 42 and 43 of the rear body component 7 and by means of ducts 44 of the cover-plate 8.

A valve 46 acting as a second closure member for controlling the return stroke of the striker-pin is capable of sliding within the front body component 6 and is fitted with an O-ring seal 47, said seal being intended to bear against an annular seating 48 of the annular cylinder end 5 when said valve takes up the active position shown in FIG. 3. A spring 52 which is applied against the annular cylinder end 5 urges the valve against the front body component 6 as shown in FIG. 1, in which the front chamber 21 of the cylinder is in communication with the atmosphere through the annular cylinder end 5 and radial ports formed in the front body component 6. The return stroke control valve 46 is provided in the central portion thereof with a flexible-lip seal 54 which serves to clean the stem of the striker-pin and does not prevent compressed air from passing from the front to the rear.

The chamber 56 which is located between the front body component 6 and the valve 46 for controlling the return stroke of the striker-pin is continuously connected to the bore 26 of the rear body component 7 by means of a duct 57 of substantial length which extends to the full length of the pistol body 1. The internal space 61 formed between the rear body component 7 and the annular valve 32 for controlling the forward stroke constitutes a valve control chamber which is connected on the one hand to the space formed between the two annular beads of the differential slide-valve 24 by means of a duct 62 of the rear body component 7 and, on the other hand, to the interior of the pistol-grip 3 by means of two ducts 64, 65 under the control of a safety slide-valve 66.

The safety slide-valve 66 is slidably fitted within a cylinder 67 which is forcibly fitted within the main body component 2 and is urged elastically by a spring 68 towards the position shown in FIG. 1 in which said slide-valve establishes a communication between the two ducts 64 and 65. Said safety slide-valve is rigidly fixed by means of a plate 71 to a tubular safety pusher 72 which is slidably mounted on the guide 14 and urged towards the exterior by a spring 73. The spring 73, the safety pusher 72 and the plate 71 as well as the corresponding extremity of the slide-valve 66 are protected by a covering cap 74 which is fixed on the front body component 6.

The pistol is fitted with a trigger 76 which is pivoted by means of a pin 77 to an end-piece 78 fixed in the pistol-grip 3 and provided with a passage 81 in which is slidably mounted a push-rod 82 for controlling a valve constituted by a ball 83. Said ball is normally applied by the pressure of the compressed air against a seating 84 of the end-piece 78 and, under the action of the trigger 76, against another seating 85 in order to close-off a duct 86 of the pistol-grip 3. Another duct 87 which extends within the pistol-grip 3 into the main body component 2 and through the cylinder 67 of the safety slide-valve serves to establish a communication between the seating 85 and the annular space 88 of the safety slide-valve. The pressure of compressed air which is admitted into the pistol-grip 3 exerts an outward thrust on the ball 83 and consequently both on the push-rod 82 and on the trigger 76.

The operation of the pistol is as follows:

It is first assumed that the pistol-grip 3 is already connected by means of its inlet 29 to a pipe for the supply of compressed air under a pressure of the order of 6 bar, for example. In the inoperative state, all the pistol components occupy the positions illustrated in FIG. 1. No pressure is exerted either on the trigger 76 or on the safety pusher 72, with the result that the safety slide-valve 66 takes up its forward position under the action of the springs 73 and 68. The piston 12 is in abutting contact with the rear body component 7 and the striker-pin 13 is in the withdrawn position. The front chamber 21 of the cylinder 4 is connected to the atmosphere through the annular cylinder end 5 and the radial ports 53 of the front body component 6 whilst the return-stroke control valve 46 is maintained applied against the front body component 6 by means of its restoring spring 52 and the seating 48 is consequently free. The forward-stroke control valve 32 is maintained applied against the rear end of the cylinder 4 under the action of its restoring spring 34 and under the action of the pressure prevailing within the chamber 61 which controls the closure of said valve. Said chamber communicates with the compressed air inlet through the duct 64, the groove 89 of the safety slide-valve 66, the duct 65 and the interior of the pistol-grip 3. The pressure which is admitted to the differential slide-valve 24 through the duct 62 gives rise to a forwardly directed force which is insufficient to enable said slide-valve to thrust-back the piston 12 and the striker-pin 13. The rear chamber 22 of the cylinder 4 is connected to the atmosphere through the ducts 41, 42, 43, 44 and the internal annular groove 37 of the forward-stroke control valve 32. The chamber 56 formed between the front body component 6 and the return-stroke control valve 46 is connected to the atmosphere as a result of the clearance which exists between the striker-pin 13 and the bore of its guide 14.

Starting from this position, nothing happens if only the trigger 76 is pressed. In fact, the only effect of the trigger is to initiate the rearward displacement of the push-rod 82 which applies the ball 83 against the seating 85 and consequently prevents the admission of air into the annular space 88 of the safety slide-valve 66 which is connected to the atmosphere through the ducts 87 and 81.

Starting from the same inoperative position shown in FIG. 1 and assuming that pressure is exerted only on the safety pusher 72, nothing happens in this case either. In fact, displacement of the safety pusher 72 is accompanied by the safety slide-valve 66 in opposition to the force of the restoring springs 73 and 68. Said slide-valve 66 is thus displaced towards the rear in the position shown in FIG. 2. In this position, the chamber 61 for controlling the closing movement of the forward-stroke control valve 32 continues to be maintained under pressure through the duct 64 although no longer through the duct 65 and the groove 89 of the safety slide-valve but through the ducts 86, 87 and the annular space 88 of said slide-valve. The other elements which are shown in FIG. 2 in positions which are different from those occupied in FIG. 1 have not been taken into consideration for the time being since FIG. 2 corresponds to the end of the active stroke of the piston as will now be explained.

In order to put the pistol into operation, it is necessary to press both on the safety pusher 72 and on the trigger 76 at the same time. The chamber 61 for controlling the closing movement of the forward-stroke control valve 32 is connected to the atmosphere through the duct 64, the annular space 88 of the safety slide-valve and the ducts 87 and 81. In consequence, the forward-stroke control valve 32 is abruptly displaced to the rear in opposition to the force of its restoring spring 34 under the pressure of compressed air which prevails within the annular chamber 28 (shown in FIG. 2) and closes-off the ducts 41 which connect the rear chamber 22 of the cylinder to the atmosphere. Consequently, the compressed air is suddenly drawn into the large-section annular space formed between the rear edge of the cylinder and the valve 32. By reason of the fact that the front chamber 21 of the cylinder is already connected to the atmosphere through the ports 53, the piston 12 is abruptly displaced in the forward direction and is accompanied by the striker-pin 13. At the end of its active stroke, the piston 12 strikes the elastic annular stop 17 as shown in FIG. 2.

Two cases are now to be contemplated for the return movement of the striker-pin to its initial position, depending on whether the trigger is released either after or before releasing the safety pusher 72.

In a first case, it will be assumed that the safety pusher 72 is released first. The springs 73 and 68 therefore return the safety pusher 72 and the safety slide-valve 66 in the forward direction in their initial positions shown in FIG. 1 and also in FIG. 3 which illustrates the stage of withdrawal or return stroke of the striker-pin and the piston. The groove 89 of the slide-valve 66 makes it possible to restore the pressure within the chamber 61 for controlling the forward-stroke control valve 32 through the ducts 64, 65. Said control valve is consequently subjected to the same pressure of compressed air on both faces of said valve and is returned to its initial position of closure of the cylinder by means of its restoring spring 34. Accordingly, the rear chamber 22 of the cylinder is connected to the atmosphere through the ducts 41, the annular groove 37 of the forward-stroke control valve 32 and the ducts 42, 43 and 44. At the same time, the compressed air pressure passes from the chamber 61 for operating the forward-stroke control valve 32 into the duct 62 and reaches the groove of the differential slide-valve 24; this latter is thus displaced in the forward direction as shown in FIG. 3 until it comes into abutting contact with the drilled partition 23. The rear end of said differential slide-valve emerges from the bore 26 of the rear body component 7, with the result that the compressed air is permitted to pass from the duct 62 into the long duct 57 which extends to the front body component. Consequently, the compressed air can reach the chamber 56 and rearwardly displace the return-stroke control valve 46 in opposition to the force of its restoring spring 52 (shown in FIG. 3). The O-ring seal 47 of said return-stroke valve is brought to bear against the seating 48 of the annular cylinder end 5 and closes-off the communication between the front chamber 21 of the cylinder and the atmosphere through the ports 53. Moreover, the compressed air passes from the chamber 56 into the front chamber 21 of the cylinder by lifting the flexible-lip seal 54. The piston 12 which is subjected to the pressure of the compressed air at the front end whilst the rear face of said piston is subjected only to atmospheric pressure therefore undergoes a rearward displacement. It is worthy of note that, during this piston return phase, leakages of compressed air between the stem of the striker-pin 13 and the bore of the guide 14 can be considered as negligible in view of the flow rate of air which is fed into the front chamber of the cylinder.

When the piston 12 reaches the end of its return stroke, the piston rod strikes the stem of the differential slide-valve 24, thus causing said slide-valve to move back to the initial position of FIG. 1. This has the effect of cutting off the admission of compressed air along the duct 57, air bleeding being carried out through the small clearance space which exists between the stem of the striker-pin 13 and the bore of its guide 14. The spring 52 initiates the forward displacement of the return-stroke control valve 46 and this latter connects the front chamber 21 of the cylinder to the atmosphere through the ports 53. All the elements have returned to their initial positions and the pistol is in readiness for a further cycle.

In the second assumption made in the foregoing, the trigger 76 is released before the safety pusher 72. The compressed air admitted through the duct 86 of the pistol-grip 3 has the effect of returning the ball 83 which has just been released by the pusher 82 and of applying said ball against the seating 84, thus closing-off the bleed passage 81 as shown in FIG. 1. But the safety slide-valve 66 which is coupled with the safety pusher 72 (this latter has not yet been released) takes up the end-of-travel position shown in FIG. 2. As a result, the compressed air within the pistol-grip is permitted to reach the duct 86, the duct 87, the annular space 88 of the safety slide-valve 66, the duct 64 and the chamber 61 for operating the forward-stroke control valve 32. This control valve therefore closes as explained in the case which was contemplated earlier and the cycle continues in the same manner.

It need hardly be added that, if the safety pusher and the trigger were to be released strictly at the same instant, all the elements of the pistol would return to their initial positions under the same conditions as those which have just been explained.

As can readily be understood, the invention is not limited to the embodiment hereinabove described with reference to the accompanying drawings. Depending on the applications which are contemplated, many modifications can accordingly be made without thereby departing either from the scope or the spirit of the invention.

What I claim is:

1. A compressed air pistol, comprising a cylinder having a closing wall at its forward end and open at its rear end,
   a piston disposed with said cylinder having a rod extending through a hole formed in the closing wall of said cylinder and movable in a forward stroke and a return stroke,
   a reservoir of compressed air,
   first valve means at the rear end of said cylinder operative to supply compressed air from said reservoir to said cylinder to effect the forward stroke of said piston,
   said first valve means comprising:
   a closed housing disposed over said cylinder to define therewith a chamber having an annular portion surrounding said cylinder and a portion extending to the rear of said cylinder,
   a closure member movably disposed within the extending chamber portion of said housing in opposition to the rear end of said cylinder,
   spring means biasing said closure member against the rear end of said cylinder to normally occlude said cylinder, and
   control means comprising trigger means, and a reversing valve independently operable from said trigger means between at least two selected positions, said trigger means and said reversing valve cooperating so that in one position of said reversing valve compressed air is supplied to the extending chamber portion to maintain said closure member fixed in occlusion with said cylinder, and in the other position of said reversing valve said extending chamber is open to atmosphere, to permit said closure member to move against the spring bias to open said cylinder to the annular chamber portion, whereby the compressed air therein actuates said piston, in its forward stroke,
   second valve means at the front end of said cylinder operative to supply compressed air from said reservoir to said cylinder to effect the return stroke of said piston, and
   switch means operable in response to operation of said control means to supply compressed air from said reservoir to said second valve means to effect the return stroke of said piston and operable on completion of the return stroke of said piston to close off the supply of compressed air thereto.

2. The compressed air pistol according to claim 1, wherein said control means includes means for preventing the premature firing of said pistol, comprising a slide valve, operable to move between a first position, which causes communication of said extending chamber portion with said reservoir of compressed air, and a second position which causes communication with the reversing valve of said control means.

3. The commmpressed air pistol according to claim 2, including a push-rod connected to said slide-valve, said push-rod disposed to extend outward of the front end of said cylinder adjacent said piston-rod, second spring means biasing said push-rod, said slide valve being in the first position when so biased.

4. The compressed air pistol according to claim 1 or 2 or 3, said second valve means comprises an annular seat formed on the inner surface of the cylinder and spaced from said closing wall, a port open to atmosphere formed in said cylinder between said annular seat and said closing wall, and a second closure member, said member being annular and having an outer periphery in slidable contact with the inner surface of said cylinder and a central opening about said piston rod, said second closure member being movable between a first position removed from said annular seat and said port and a second position effective to occlude said annular seat and to form an enclosed space with said closing wall communicating with said cylinder through its central opening, and conduit means leading from said switch means to said enclosed space, the compressed air passing through the central opening of the second closure member for impingement against said piston.

5. The compressed air pistol according to claim 4, including a flexible lip member mounted about the central opening of the second closure member to engage said piston rod and permit air flow therethrough only in the backward direction from said enclosed space toward said cylinder.

6. The compressed air cylinder according to claim 4, including third spring means interposed between said annular seat and said second closure to normally bias said second closure, removed from said annular seat and said port.

7. The compressed air pistol according to claim 4, wherein said switch means comprises a differential spool valve having a pair of flanges of different diameter, separated by an annular space, said annular space being in communication with said extending chamber portion to receive compressed air upon actuation of said first valve means to initiate the return stroke of said piston by shifting said spool, said smaller flange lying in a bore in communication with said second valve means, which bore is caused to come into communication with the annular space on shifting of said spool, whereby compressed air is supplied to said second valve means.

* * * * *